(12) United States Patent
Kaal

(10) Patent No.: US 8,874,536 B2
(45) Date of Patent: Oct. 28, 2014

(54) MATCHING INFORMATION ITEMS

(75) Inventor: Madis Kaal, Tallinn (EE)

(73) Assignee: Skype, Dublin (IE)

( * ) Notice: Subject to any disclaimer, the term of this patent is extended or adjusted under 35 U.S.C. 154(b) by 562 days.

(21) Appl. No.: 12/640,844

(22) Filed: Dec. 17, 2009

(65) Prior Publication Data

US 2011/0113029 A1    May 12, 2011

(30) Foreign Application Priority Data

Nov. 10, 2009 (GB) .................................. 0919675.9

(51) Int. Cl.
*G06F 17/30* (2006.01)
*H04L 29/08* (2006.01)

(52) U.S. Cl.
CPC .............. *H04L 67/104* (2013.01); *H04L 67/24* (2013.01); *H04L 67/1068* (2013.01); *H04L 67/306* (2013.01)
USPC ......................................................... 707/698

(58) Field of Classification Search
USPC ......................................................... 707/698
See application file for complete search history.

(56) References Cited

U.S. PATENT DOCUMENTS

| | | | | |
|---|---|---|---|---|
| 6,064,736 | A * | 5/2000 | Davis et al. .................... | 713/155 |
| 8,363,961 | B1 * | 1/2013 | Avidan et al. .................. | 382/225 |
| 2004/0148506 | A1 * | 7/2004 | Prince ............................ | 713/176 |
| 2005/0234901 | A1 * | 10/2005 | Caruso ............................. | 707/4 |
| 2006/0004789 | A1 | 1/2006 | Lunt et al. | |

(Continued)

FOREIGN PATENT DOCUMENTS

| | | |
|---|---|---|
| GB | 2475251 | 5/2011 |
| GB | 2475252 | 5/2011 |

(Continued)

OTHER PUBLICATIONS

Bittorrent Protocol Specification v1.0, Sep. 12, 2006, available at http://wiki.theory.org/index.php?title=BitTorrentSpecification &oldid=4760.*

(Continued)

*Primary Examiner* — Ajay Bhatia
*Assistant Examiner* — Kurt Mueller
(74) *Attorney, Agent, or Firm* — Sonia Cooper; Micky Minhas; Wolfe-SBMC

(57) ABSTRACT

In one embodiment, a method of identifying the presence of matching information items in a network includes using a hashing scheme to generate a set of first hash values from a respective set of first information items stored at a first node and transmitting the set of first hash values over the network to a second node. The set of first hash values is compared at the second node with a set of second hash values generated, using the hashing scheme, from a respective set of second information items stored in the network, to thereby determine at least one matching hash value between the set of first hash values and the set of second hash values. The determined matching hash value is used to identify the presence of at least one matching information item between the set of first information items and the set of second information items. The hashing scheme is chosen so that a unique hash value in the hashing scheme indicates a sufficient number of information items to prevent the unique hash value being used as an identifier of a unique information item, such that the transmission of the set of first hash values to the second node does not disclose the set of first information items to the second node.

20 Claims, 5 Drawing Sheets

(56) References Cited

U.S. PATENT DOCUMENTS

| | | | |
|---|---|---|---|
| 2006/0190536 | A1 | 8/2006 | Strong et al. |
| 2007/0150948 | A1* | 6/2007 | De Spiegeleer ................ 726/22 |
| 2007/0294243 | A1* | 12/2007 | Caruso ............................. 707/5 |
| 2008/0059576 | A1 | 3/2008 | Liu et al. |
| 2009/0070684 | A1 | 3/2009 | Aldrich et al. |
| 2009/0319288 | A1 | 12/2009 | Slaney et al. |
| 2009/0319466 | A1 | 12/2009 | Liu et al. |
| 2010/0057732 | A1 | 3/2010 | O'Sullivan et al. |
| 2010/0106713 | A1* | 4/2010 | Esuli et al. .................... 707/716 |
| 2010/0191844 | A1 | 7/2010 | He et al. |
| 2011/0113029 | A1* | 5/2011 | Kaal ............................ 707/723 |
| 2011/0113149 | A1 | 5/2011 | Kaal |

FOREIGN PATENT DOCUMENTS

| | | |
|---|---|---|
| WO | WO 2007/106791 A2 | 9/2007 |
| WO | WO 2008/041173 A2 | 4/2008 |
| WO | WO-2011058056 | 5/2011 |
| WO | WO-2011058057 | 5/2011 |

OTHER PUBLICATIONS

SHA-1. (Dec. 13, 2011). In Wikipedia, The Free Encyclopedia. Retrieved 17:00, Dec. 19, 2011, from http://en.wikipedia.org/w/index.php?title=SHA-1&oldid=465712769.*

MD5. (Dec. 16, 2011). In Wikipedia, The Free Encyclopedia. Retrieved 17:00, Dec. 19, 2011, from http://en.wikipedia.org/w/index.php?title=MD5&oldid=466201982.*

Search Report, dated Mar. 9, 2011, for Application No. GB0919675.9, consisting of 1 page.

Chiou, S., et al., "Common Friends Discovery with Privacy and Authenticity," *2009 Fifth International Conference on Information Assurance and Security*, pp. 337-340 (2009).

Von Arb, M., et al., "VENETA: Serverless Friend-of-Friend Detection in Mobile Social Networking," *IEEE International Conference on Wireless & Mobile Computing, Networking & Communication*, pp. 184-189 (2008).

Notification of Transmittal of the International Search Report and the Written Opinion of the International Searching Authority, or the Declaration, dated Apr. 1, 2011, for Application No. PCT/EP2010/067210, consisting of 13 pages.

"International Search Report and Written Opinion", Application No. PCT/EP2010/067209, (Feb. 8, 2011), 9 pages.

"Non Final Office Action", U.S. Appl. No. 12/640,928, (Dec. 14, 2011), 23 pages.

"Search Report under Section 17", Application No. GB0919674.2, (Mar. 7, 2011), 1 page.

"Non-Final Office Action", U.S. Appl. No. 12/640,928, (Aug. 1, 2012), 24 pages.

"Final Office Action", U.S. Appl. No. 12/640,928, (Feb. 1, 2013), 24 pages.

* cited by examiner

MATCHING INFORMATION ITEMS

RELATED APPLICATION

This application claims priority under 35 U.S.C. §119 or 365 to Great Britain, Application No. 0919675.9, filed Nov. 10, 2009. The entire teachings of the above application are incorporated herein by reference.

TECHNICAL FIELD

This invention relates to finding matching information items in a network.

BACKGROUND

A network typically comprises a plurality of nodes which can communicate with each other, such that each node in the network is capable of communicating with at least one other node in the network. The network may be for example the internet, but other networks may be used alternatively or additionally. Nodes can communicate in the network using links that may be direct links between the nodes, or alternatively the links may be indirect links through the network, such that the nodes communicate with each other via at least one other node in the network.

The network may employ a packet-based communication system. Packet-based communication systems allow the user of a device, such as a personal computer, to communicate across the network. One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system to engage in communication. Further details on such a P2P system are disclosed in WO 2005/009019.

A first node in the network may store details of contacts of a first user of the first node. The first node, or the first user, may be interested in determining whether any of the first user's contacts are also contacts of a second user at a second node in the network. One method for determining if there are any common contacts between the first and second users is for the first node to send a list of the first user's contacts to the second node. The second node can then compare the first and second user's contacts to find common contacts and can return the results to the first node.

In another scenario, a social networking site in the network may be used to find users in the network who share common interests. The users can transmit identifiers of their interests to a node of the social networking site, so that the social networking site can compare the interests of different users to identify users with common interests. A recommendation may then be sent to at least one of the identified users to indicate that the identified users share common interests.

In a further scenario in which the network is a file sharing network, some nodes in the network are file sharing nodes, whereby files stored at the file sharing nodes can be retrieved by other nodes in the network. Each file sharing node sends identifiers, such as filenames, of files stored at the sharing node to a central index node. A user wanting to find a desired file in the file sharing network can send a request to the central index node identifying the desired file. The central index node can compare the request with the identifiers received from the sharing nodes to find any matches. If the central index node determines that the desired file is stored on a sharing node then the central index node can inform the user searching for the desired file of the location of the sharing node in the network. The user can then contact the sharing node to request the desired file.

The inventor has appreciated that there are two common problems with the separate scenarios described above. Firstly, the transmission of the contact details, the identifiers of interests or the identifiers of files over the network requires a large amount of data to be transmitted across the network. This reduces the network resources that are available for other purposes. Secondly, there may be a security or privacy problem in the scenarios described above. For example, a first user might not want to reveal his contacts to a second user. As another example, users might not want to reveal their interests to a social networking site. Furthermore, a sharing node may not want to reveal the files stored at the sharing node to a central index node and also a user searching for a desired file may not want to reveal the desired file to the central index node.

SUMMARY

In a first aspect of the invention there is provided a method of identifying the presence of matching information items in a network, the network comprising a first node and a second node, the method comprising: using a hashing scheme to generate a set of first hash values from a respective set of first information items stored at the first node; transmitting the set of first hash values over the network to the second node; comparing the set of first hash values at the second node with a set of second hash values generated, using the hashing scheme, from a respective set of second information items stored in the network, to thereby determine at least one matching hash value between the set of first hash values and the set of second hash values; using the determined at least one matching hash value to identify the presence of at least one matching information item between the set of first information items and the set of second information items, wherein the hashing scheme is chosen so that a unique hash value in the hashing scheme indicates a sufficient number of information items to prevent the unique hash value being used as an identifier of a unique information item, such that the transmission of the set of first hash values to the second node does not disclose the set of first information items to the second node.

In a second aspect of the invention there is provided a network comprising: a first node comprising means for using a hashing scheme to generate a set of first hash values from a respective set of first information items stored at the first node; and a second node comprising: means for receiving the set of first hash values over the network; means for comparing the set of first hash values with a set of second hash values generated, using the hashing scheme, from a respective set of second information items stored in the network, to thereby determine at least one matching hash value between the set of first hash values and the set of second hash values, wherein the determined at least one matching hash value is used to identify the presence of at least one matching information item between the set of first information items and the set of second information items, and wherein the hashing scheme is chosen so that a unique hash value in the hashing scheme indicates a sufficient number of information items to prevent the unique hash value being used as an identifier of a unique information item, such that the transmission of the set of first hash values to the second node does not disclose the set of first information items to the second node.

Embodiments of the present invention provide a method of identifying commonly held information items in a peer to peer system without disclosing the held information items to another peer in the network. This is achieved by comparing hash values generated from the information items while ensuring that the number of possible hash values in the hashing scheme is smaller, and preferably significantly smaller, than the total number of information items in the peer to peer system. The hash values thus collide heavily across the whole set of information items in the system. This ensures that a 1:1 correspondence of hash values and information items cannot be established, such that disclosing a hash value to a node does not disclose the information item used to generate the hash value to the node. In this way the invention allows commonly held information items to be identified without unnecessarily transmitting the information items over the network (and thereby unnecessarily using network resources) to a node, and without disclosing, or uniquely identifying, the information items to the node.

Hashing schemes are known which may be used to generate hash values from information items, such that the hash values can be compared rather than the information items in order to find matching information items. Hashing is a technique for compacting information to identifiers (hash values), in such a way that both the content of the information items and the order of the information items in the list of information items are taken into account in generating hash values from a list of information items. Typically, hash values are smaller than the information items from which they are generated. The situation in which a single hash value corresponds to more than one information item is called a "hash collision". Where a hashing scheme is used in which there are no hash collisions, the identification of matching hash values equates to an identification of matching information items identified by the hash values.

Using hash values rather than the information items themselves reduces the amount of data transmitted over the network and hides the content of the information items. Hash values may be generated using a one-way hashing algorithm. Hash functions are by definition non-reversible, meaning that the original content from which the hash was calculated cannot be recreated from the hash value, thereby protecting the original content. This assumes that the content is large enough to make a brute-force attack (which involves generating hash values of all possible variations of the content) infeasible. It can therefore be seen that using the hash values provides a level of security to protect against the disclosure of information items.

Since hash values are generally smaller than the information items from which they are generated, it is possible that more than one information item will generate the same hash value using a particular hash function, i.e. there is a hash collision.

Typically, hash functions are carefully chosen to minimize the number of hash collisions in the network. By minimizing the number of hash collisions, hash values can be used for indexing large data items to save index space. Data items found by hash index may be further compared to eliminate unwanted records that were retrieved because of a hash collision. Since the number of hash collisions in the hashing scheme is minimized, the number of comparisons of the large data items that is required is minimized. Hash values may also be used to detect duplicates in large data sets where directly comparing data items to many other data items would be prohibitively complicated. The data items are first hashed, and then the resulting hash values are compared. In all of these systems, the hashing scheme is chosen to minimize, or if possible eliminate, the occurrences of hash collisions. The hashing scheme can be said to have 'uniqueness' if there are no hash collisions, and to have near uniqueness if there are a small number of hash collisions.

In some applications hash functions are chosen in such a way that similar information items produce hash values that are also similar. This property can be used to facilitate data distribution into separate 'bins' while still preserving a property of hash uniqueness.

In some systems, such as a P2P communication system as described above, privacy concerns make it undesirable to reveal information held at one node to another node in such a way that the information can be seen, or even uniquely identified by the other node. For example, in a P2P system, although the presentation of digital certificates provides sufficient trust in the identity of a user for communication to be established with that user across the network, the digital certificates might not provide sufficient trust for disclosing information items to that user. Although using a hashing scheme provides a degree of privacy for the information items, the usually desirable uniqueness property (or near uniqueness) of hash functions makes identification of information items that generated the hash values possible by creating a pre-calculated mapping between information items and their hash values. This is known as a "dictionary attack" in which all of the possible hash values are pre-computed and stored in a "dictionary" in association with the corresponding information items from which they are generated. If a hash value is known, the information item that generates the hash value can then be determined using the "dictionary".

However, in embodiments of the present invention, the hashing scheme is intentionally chosen such that it generates hash values that collide so frequently that a hash value cannot be reliably used as a unique identifier of an information item. This is contrary to hashing practice in most prior applications in which the hashing scheme is chosen to minimize the occurrence of hash collisions.

Embodiments of the present invention are particularly useful in systems where different information items are held at different nodes while the nodes or users of the nodes involved do not trust each other fully. Such systems can be P2P networks for use in file sharing or instant messaging. In one embodiment, the method can be used to find out potentially interesting information, such as commonly shared contacts between users in a P2P instant messaging system. In another embodiment, the method can be used to locate potential sources of information items without revealing exactly what information is being sought, such as locating a file in P2P file sharing system. In a further embodiment, the method can be used to identify users in the network with common interests without revealing the interests themselves.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
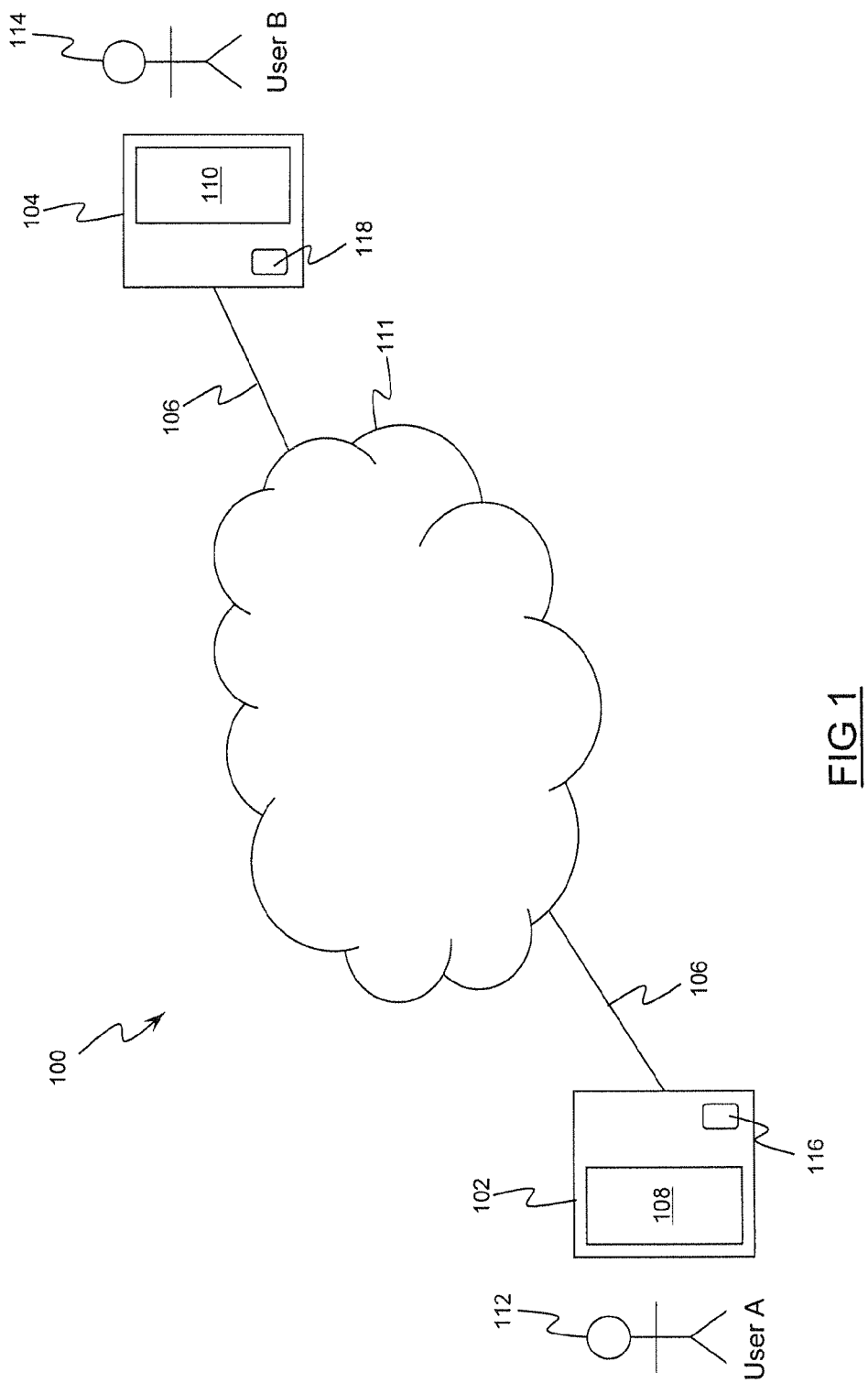
FIG. 1 is a schematic diagram of a communications system according to a preferred embodiment.

In embodiments of the invention a P2P communication system is operated on a network. FIG. 1 illustrates a packet-based P2P communication system 100. A first user of the communication system (User A 112) operates a user terminal 102, which is shown connected to the rest of the network 111. The user terminal 102 may be, for example, a mobile phone, a personal digital assistant ("PDA"), a personal computer ("PC") (including, for example, Windows™, Mac OS™ and Linux™ PCs), a gaming device or other embedded device able to connect to the network 111. The network 111 may be, for example, the internet. The user device 102 is arranged to receive information from and output information to a user 112 of the device. In a preferred embodiment the user device 102 comprises a display such as a screen and an input device such as a keypad, joystick, touch-screen, keyboard and/or mouse. The user device 102 is connected to the network 112 via link 106.

Note that in alternative embodiments, the user terminal 102 can connect to the communication network 111 via additional intermediate networks not shown in FIG. 1. For example, if the user terminal 102 is a mobile device, then it can connect to the communication network 111 via a cellular mobile network (not shown in FIG. 1), for example a GSM or UMTS network.

The user terminal 102 is running a communication client 116, provided by the software provider. The communication client 116 is a software program executed on a local processor in the user terminal 102.

Figure 2:
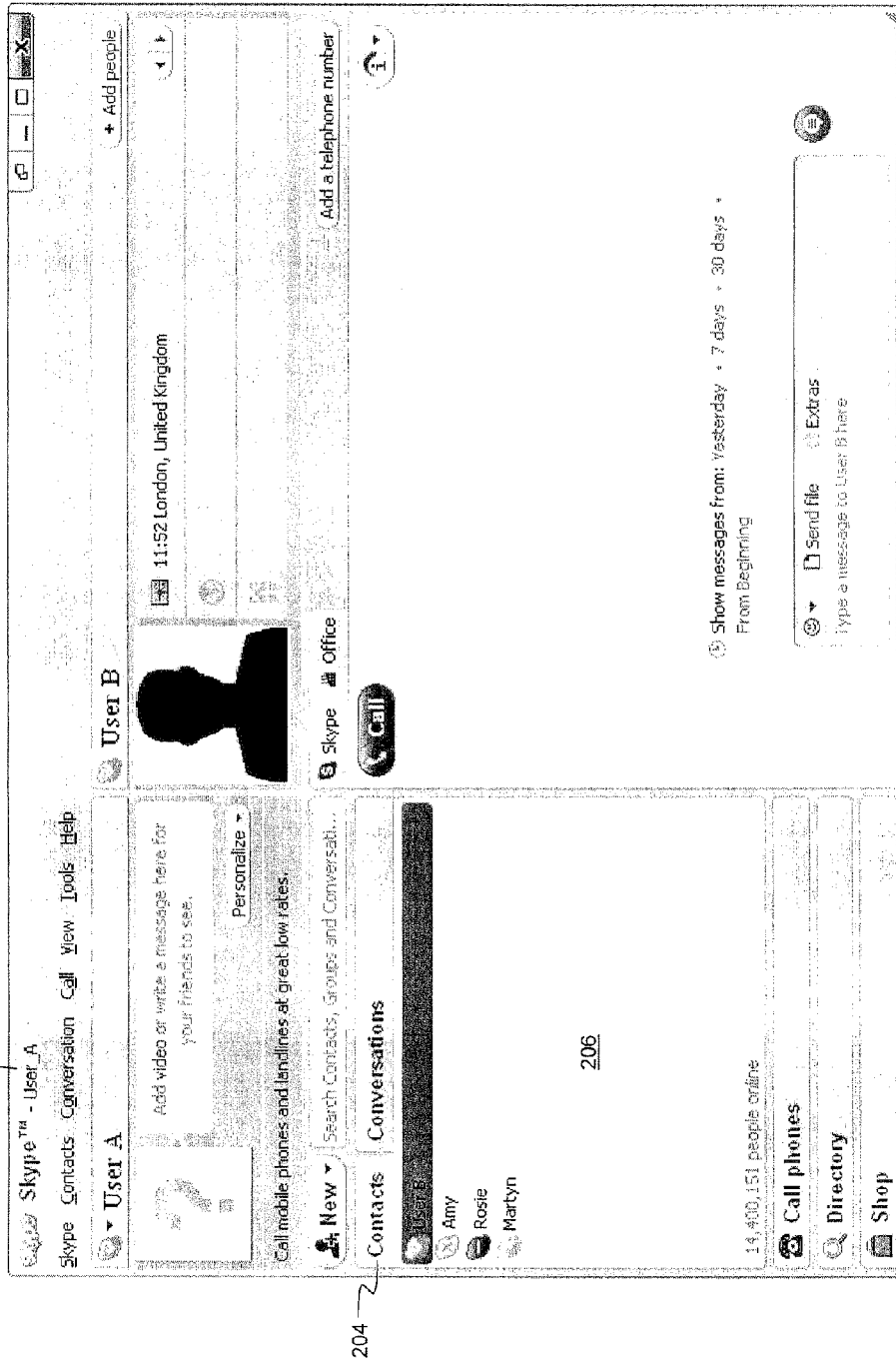
FIG. 2 shows a user interface according to a preferred embodiment.

An example of a user interface 200 of the communication client 116 executed on the user terminal 102 of the first user 112 is shown illustrated in FIG. 2. Note that the user interface 200 can be different depending on the type of user terminal 102. For example, the user interface can be smaller or display information differently on a mobile device, due to the small screen size. In the example of FIG. 2, the client user interface 200 displays the username 202 of "User_A" 112 in the communication system. The client user interface 200 comprises a tab 204 labelled "contacts", and when this tab is selected the contacts of User A in the P2P communication system are displayed in a pane 206 below the tab 204. In the example user interface in FIG. 2, four contacts of other users of the communication system are shown listed in pane 206, those being contacts with usernames "User B", "Amy", "Rosie" and "Martyn" as shown in FIG. 2. Each of these contacts have authorised User A 112 of the client 116 to view their contact details.

Returning to FIG. 1, node 102 comprises a store 108 for holding information or data. The information is typically in the form of discrete information items. The information items may be for example details of the contacts of the user 112 or identifiers of files stored at the node 102 or identifiers of interests of the user 112. The link 106 connects the user device 102 to a second user device 104 over the network 111. The link 106 may be a direct connection between nodes 102 and 104, or alternatively the link 106 may be an indirect connection between nodes 102 and 104 via other nodes in the rest of the network 111. Node 104 is associated with User B 114 and comprises a communication client 118 and an information store 110 similar to those of node 102.

It may be desired to identify the presence of matching information items between information items stored in the stores 108 and 110. However, due to security and privacy issues, which can be particularly important in P2P systems, it may be undesirable to reveal information items to another node, or even to uniquely identify the information items to the other node.

By using a hashing scheme as described above, node 102 can generate a list of hash values using a hashing function from the information items in store 108 at node 102 and transmit the hash values to the node 104 via the link 106. Node 104 can generate hash values from the list 110 of information items in store 110 at the node 104 using the same hashing function and compare those hash values with the hash values received from node 102 to find matching hash values. If the hashing scheme has no hash collisions, the identification of matching hash values equates to an identification of matching information items identified by the hash values.

Hash functions with uniqueness or near uniqueness allow for identification of information items that generated the hash values. For example, if node 102 transmits a list of hash values to node 104 indicating the information items in store 108, and the hash values are generated using a hashing scheme which has no colliding hash values, then if one of the hash values received at node 104 matches a hash value generated from an information item in store 110, then node 104 can conclude that node 102 has an information item matching the information item in list 110 which was used to generate the matching hash value. Furthermore, if node 104 is able to determine an information item that would generate the hash value then node 104 can conclude that that information item is stored at node 102. In hashing schemes which have near uniqueness, although it may not be possible to uniquely identify an information item from a matching hash value, the information item can be identified as being one of only a few possible information items.

The inventor has realised that matching hash values can be used to identify the presence of matching information items using a hashing scheme in which the number of unique hash values is less than the number of unique information items in the system. This means that the same hash value is generated from more than one unique information item in the hashing scheme. The number of unique information items indicated by one hash value in the hashing scheme can be chosen in dependence upon the context in which the hash values are used. For example, in one context where the information items are details of a user's contacts, each hash value may preferably indicate hundreds of information items, whereas in another context where the information items are identifiers of files stored at a sharing node, each hash value may preferably indicate fewer information items, for example approximately ten information items. In preferred embodiments, the number of unique hash values is at least an order of magnitude less than the number of unique information items in the system. In these preferred embodiments, one unique hash value is generated from at least 10 unique information items. As an example, the number of unique information items may be 300 million, and, depending on the context, a suitable hashing scheme may be a 16-bit CRC which has a total of 65536 unique hash values, such that each hash value indicates an average of 4500 information items. Therefore by disclosing the hash value to another node in the network, the information item cannot be uniquely identified (in the example the information item may be one of 4500 information items), so the other node is prevented from using the hash value as an identifier of a unique information item. The hash value can only be used by the other node to identify that the information item is one from a group of information items which generate the same hash value.

Three particularly useful embodiments will now be described. The first embodiment is described with reference to FIGS. 3 and 4, the second embodiment will be described with reference to FIGS. 5 and 6 and the third embodiment will be described with reference to FIGS. 7 and 8.

Figure 4:
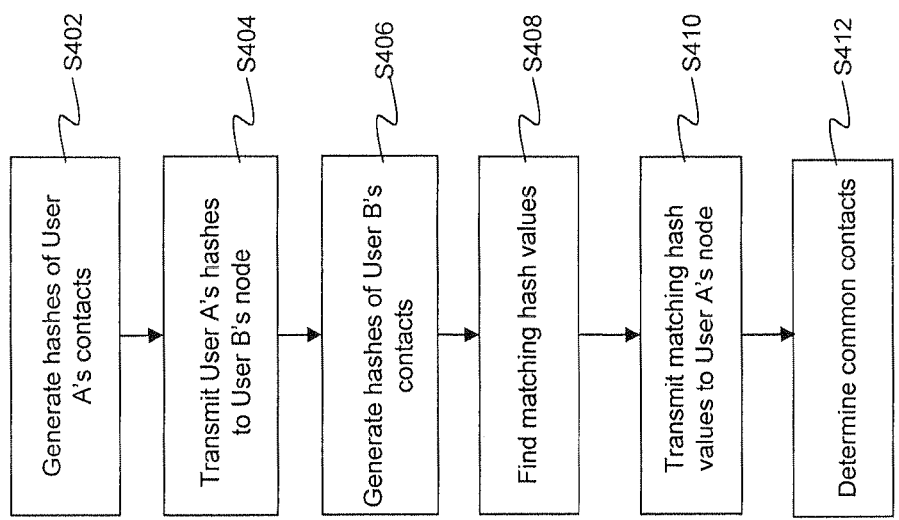
FIG. 4 shows a flowchart of a process for determining common contacts in the first embodiment.
Figure 3:
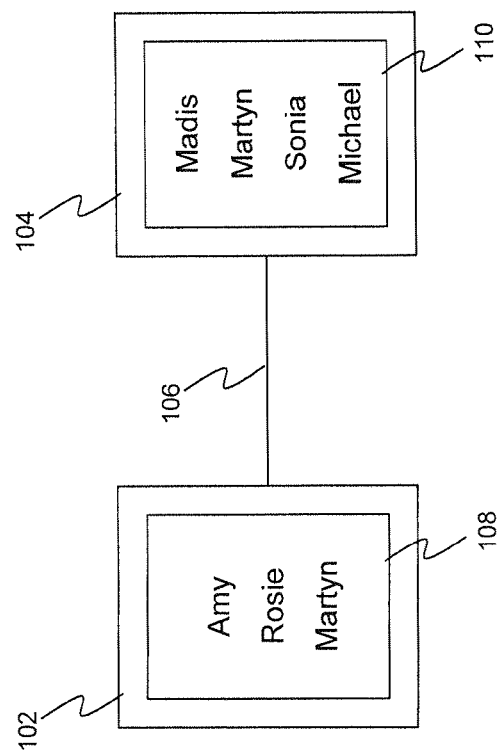
FIG. 3 represents the network of a first embodiment.

The first particularly useful embodiment relates to finding common contacts between users in a network. FIG. 3 shows the user nodes 102 and 104 being connected via the link 106. The store 108 on node 102, holds the usernames of contacts of User A 112. In the example shown in FIG. 3, the store 108 holds the usernames "Amy", "Rosie" and "Martyn". The store 110 on node 104, holds the usernames of contacts of User B 114. In the example shown in FIG. 3, store 110 holds the usernames "Madis", "Martyn", "Sonia" and "Michael". User A 112 of node 102 would like to determine whether any of his contacts are also contacts of User B 114 of node 104, but User A does not want to disclose his list of contacts to User B at node 104. In order to do this, the method shown in FIG. 4 is used.

In step S402, node 102 generates hash values of the contact usernames stored in store 108 according to a hashing scheme as described above. In step S404, the hash values of User A's contacts are transmitted over the network on link 106 to node 104. As described above, one hash value in the hashing scheme corresponds to more than one contact username (i.e. the ratio of hash values to contact usernames in the system is 1:many). Therefore, node 104 cannot reliably determine the contacts of User A 112 using the hash values provided from node 102.

In step S406, node 104 generates hash values of the contact usernames stored in store 110 according to the same hashing scheme as that used to generate the hash values of the contact usernames of User A 112.

In step S408, the hash values received from node 102 are compared with the hash values generated at node 104 to find matching hash values. In step S410, the matching hash values are transmitted over the network to node 102 via link 106. In step S412, node 102 determines the contact usernames that were used to generate the matching hash values, in order to determine common contacts between User A 112 and User B 114.

In the example shown in FIG. 3, the user in the system with username "Martyn" is a contact of both User A 112 and User B 114. The hash value generated for username "Martyn" will be found as a matching hash value in step S408, and then in step S412 it will be determined that Martyn is a common contact of User A 112 and User B 114. The hashing scheme is chosen to have significantly less unique hash values than there are users in the system, such that one hash value may be generated from many usernames. However, there are significantly more unique hash values in the hashing scheme than there are contact usernames in the stores 108 and 110. As an example, in the whole communication system there may be 300 million users with different usernames. A suitable hashing scheme is a 16-bit CRC which has a total key space of 65,536, i.e. there are 65,536 unique hash values which can be used to indicate the usernames. In this example each unique hash value would indicate an average of 4500 usernames in the entire P2P system, but User A has three contacts and User B has four contacts, so it is unlikely that more than one contact of User A or User B will be indicated by the same hash value. In the example shown in FIG. 3, the probability of a random hash collision is given by: (no. of User A's contacts)×(no. of User B's contacts)/(no. of unique hash values in hashing scheme)=12/65536≈0.00018. This is so low that in this case, any matching hash values can be taken to be indicative of matching contacts.

The reason that matching hash values can be assumed to be indicative of matching contacts despite each hash value representing 4500 contact usernames on average in this case is because it is more likely that the Users 112 and 114 have common contacts than it is that two different contacts of user 112 or user 114 randomly generate the same hash value. This is true because there is an association between the contacts of User A 112 and the contacts of User B 114. In particular, User A 112 knows User B (User B 114 might be a contact of User A 112, or User A 112 might simply be aware of User B 114), which means that a contact of User B 114 is much more likely, than a completely random user in the network 111, to be a contact of User A. In this way, by choosing a suitable hashing scheme, it can be ensured that when comparing contacts of users who know each other, matching hash values predominantly indicate matching contacts rather than hash collision of different contacts. This allows matching hash values to be assumed to be indicative of matching contacts. One particularly useful scenario in which the method can be used is for allowing a Friends of Friends search to be executed on P2P nodes without revealing the contact names between P2P nodes that are participating in the search, while still allowing the identification of shared contacts.

This method is not limited to use in determining common contacts between users who know each other. Indeed the method will work for any type of information item stored in lists on different nodes in the network, where there is an association between the lists which increases the likelihood that information items in one list will be present in the other list. Where the lists are associated in such a way that the probability of one of the information items in one list matching one of the information items in the other list is greater than the probability of two different information items being identified by the same hash value in the hashing scheme, then matching hash values can be taken to be indicative of matching information items. In this way, common information items between the stores 108 and 110 can be found without disclosing the information items stored in node 108 or in node 110 to any node in the network. A node receiving the hash values of the information items in store 108 from node 102 cannot determine the information items in store 108 because each hash value identifies many different information items in the hashing scheme.

In an alternative embodiment, hash values of the information items in store 108 may be transmitted to a third node (not shown in FIG. 3), and hash values of the information items in store 110 may also be transmitted to the third node, wherein the hash values are compared at the third node to find matching hash values between the stores 108 and 110. In this embodiment, the hash values are not sent to the node 104, which may be beneficial if User A 112 has more trust in the third node than in node 104 and/or in User B 114.

Figure 6:
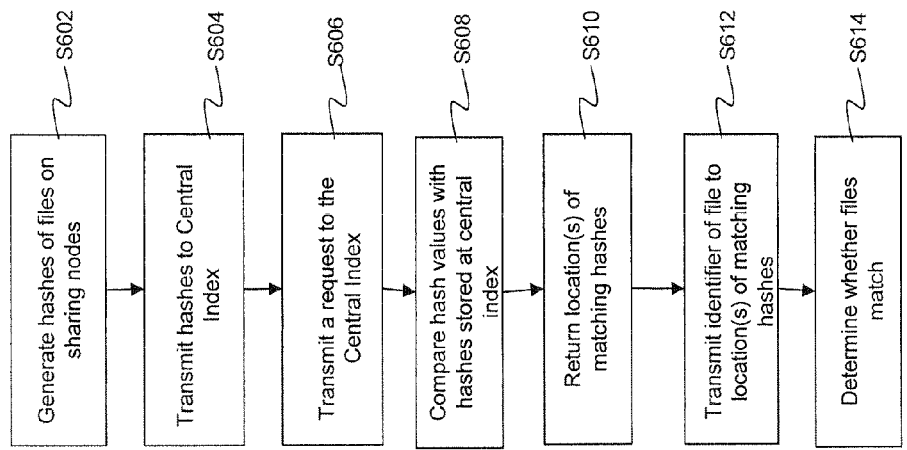
FIG. 6 shows a flowchart of a process for locating files in the second embodiment.
Figure 5:
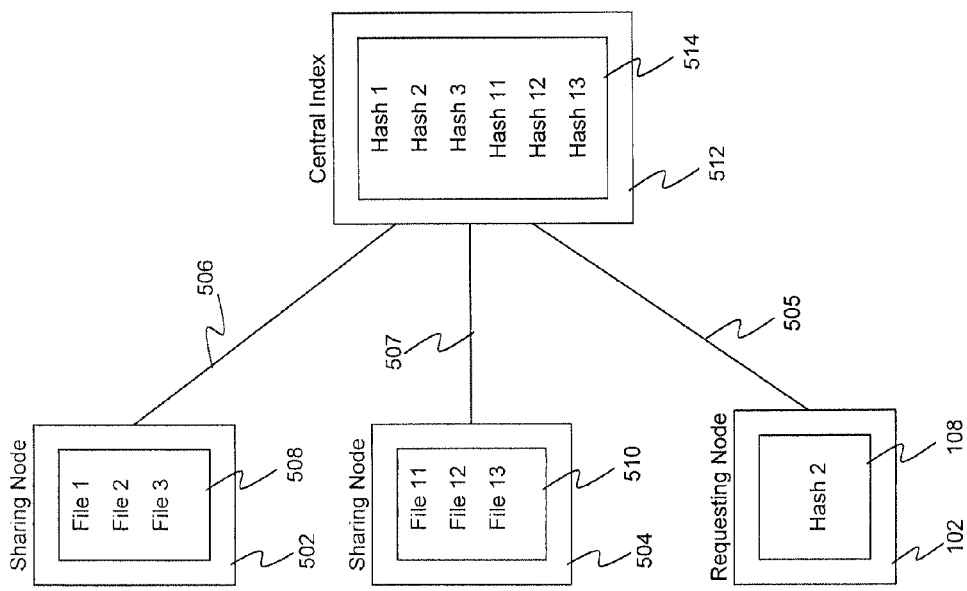
FIG. 5 represents the network of a second embodiment.

A second particularly useful embodiment is described with reference to FIGS. 5 and 6 and relates to file sharing in a network. FIG. 5 shows a first sharing node 502 storing File 1, File 2 and File 3 in a store 508 and a second sharing node 504 storing File 11, File 12 and File 13 in a store 510. The sharing nodes 502 and 504 can communicate with a central index 512 over the network via respective links 506 and 507. Similarly to link 106 described above, links 506 and 507 may be direct or indirect links over the network.

In step S602 hash values of the files stored at sharing node 502 are generated at node 502 using a suitable hashing scheme as described above to prevent the hash values being used as identifiers of unique files and hash values of the files stored at sharing node 504 are generated at node 504 using the same hashing scheme. In step S604 the hash values generated at node 502 are transmitted over link 506 to the central index 512 and the hash values generated at node 504 are transmitted over link 507 to the central index 512. The hash values are stored in store 514 at the central index 512. There may be many sharing nodes in the network, but only two (nodes 502 and 504) are shown in FIG. 5 for clarity. The store 514 stores the hash values in such a way that it can associate a hash value in the store 514 with the one of the sharing nodes (e.g. 502 or 504) from which the hash value was received. This may be done by any suitable method such as by storing the hash values from different sharing nodes in different lists, or by linking each hash value in the store 514 to the relevant sharing node.

A requesting node 102 such as node 102 shown in FIG. 1 associated with User A 112 can communicate with central index 112 over the network via a link 505. Similarly to link 106 described above, link 505 may be a direct or an indirect link over the network. Node 102 has a store 108 which can store one or more hash values of files that the node 102 would like to find in the network. For example as shown in FIG. 5, the user 112 wants to find File 2 and the store 108 stores "Hash 2" which corresponds to File 2 stored at sharing node 502. In step S606 the requesting node transmits a request to the central index using link 505 to locate the file which corresponds to the hash value stored in the store 108. The request includes the hash value "Hash 2" from the store 108.

In step S608 the hash value received from the requesting node 102 is compared with the hash values stored in store 514 at the central index 512 to determine any matching hash values. The location(s) of sharing nodes which store files identified by the matching hash values is(are) determined. Since a hash value corresponds to many files in the hashing scheme, it is possible that a matching hash value does not indicate the correct file that node 102 is searching for. However, the location(s) of the sharing nodes determined in step S608 are returned to the requesting node 102 in step S610. For example, in the system shown in FIG. 5, the location of the first sharing node 502 will be returned to the requesting node because Hash 2 corresponds to File 2 stored at node 502. However, it is also possible that, for example, Hash 11 generated from File 11 is the same as Hash 2 generated from file 2, so the location of the second sharing node 504 may also be returned to the requesting node 102.

In step S612 the requesting node 102 contacts the identified sharing node(s) over the network to determine whether the correct file (File 2) is stored at the sharing node(s). This may be done by transmitting an identifier of the file to the sharing node that is more precise than the hash values used previously. The more precise identifier may be a different hash value calculated using a different hashing scheme. In the different hashing scheme, a hash value may identify a unique file. Alternatively, the more precise identifier may be the filename of the file. Other identifiers may be used as would be apparent to the skilled person. In step S614, the sharing node(s) use the more precise identifier to determine whether the sharing node holds the file that the requesting node is searching for. In the example shown in FIG. 5, the first sharing node 502 will determine that File 2 is the file that the requesting node 102 is searching for, and may then transmit the file to the requesting node 102. However, the second sharing node 504 will determine that File 11 is not the file that the requesting node is searching for even though Hash 11 happened to match Hash 2. Even if the file at the sharing node is the file that the requesting node is searching for, the sharing node may decide not to transmit the file to the requesting node.

In some embodiments, in step S612, the requesting node will be required to send an authentication to the sharing node. The sharing node will then check the authentication and only if the requesting node is authenticated will the sharing node transmit the file to the requesting node in step S614. In a P2P system as described above, the authentication could be the digital certificate of the requesting node 102.

When the method is used in a system for file sharing such as that described above in relation to FIGS. 5 and 6, the central index can store hash values of files stored at sharing nodes, and because the hash values do not identify unique files, the actual files stored at the sharing nodes cannot be determined from an inspection of the central index. Furthermore, the requesting node 102 can send a request to the central index 512, and the actual information being searched for is not disclosed. However, it is still possible to use the central index to search for files stored on sharing nodes in the network using the method described above.

The method of the second particularly useful embodiment is described above with reference to FIGS. 5 and 6 in relation to information items being identifiers of files stored at the nodes. However, the method can be used for other information items where it is desired to identify sharing nodes which are storing particular information items.

Figure 8:
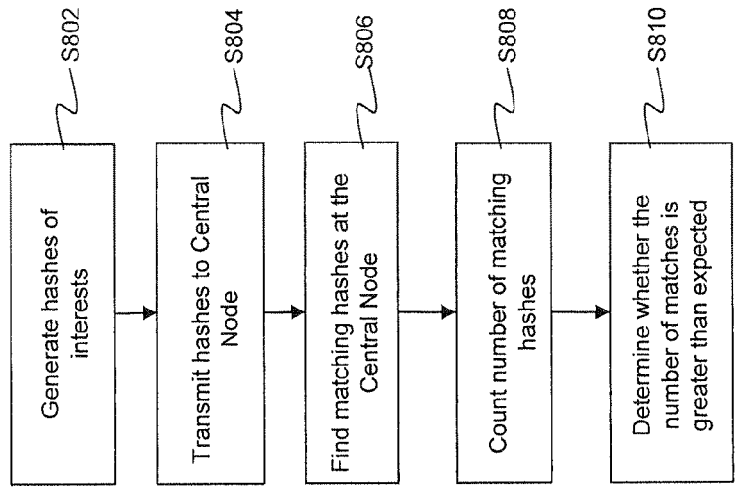
FIG. 8 shows a flowchart of a process for identifying users with common interests in the third embodiment.
Figure 7:
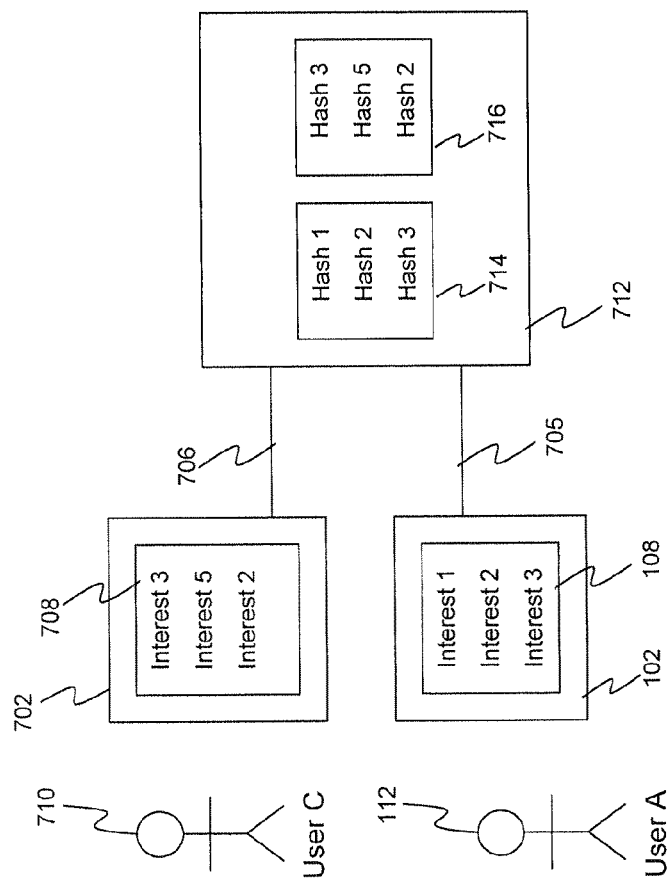
FIG. 7 represents the network of a third embodiment.

A third particularly useful embodiment is described with reference to FIGS. 7 and 8 and relates to finding users with similar interests in a network. FIG. 7 shows a first user node 102 which is associated with User A 112. The store 108 on node 102 holds identifiers of interests of User A 112. Similarly, node 702 is associated with User C 710 and comprises a store 708 which holds identifiers of interests of User C 710. A central node 712 in the network can communicate with node 102 via link 705 and can communicate with node 702 via link 706. Similarly to link 106 described above, links 705 and 706 may be direct or indirect links over the network.

As examples, URLs and search keywords can be used as identifiers of a user's interests. Images viewed by a user from a database of images can also be used as identifiers of a user's interests.

In step S802 node 102 generates a set of hash values from the identifiers of the interests in store 108 using a suitable hashing scheme as described above. Similarly, node 702 generates a set of hash values from the identifiers of the interests in store 708 using the same hashing scheme. In step S804 the set of hash values generated at node 102 is transmitted to the central node 712 using the link 705 and the set of hash values generated at node 702 is transmitted to the central node 712 using the link 706. The sets of hash values are stored at the central node 712. In the example shown in FIG. 7, the set of hash values received from node 102 is stored in a store 714 and the set of hash values received from node 702 is stored in a store 716. In other embodiments, sets of hash values received from different nodes are stored in the same store at the central node 712 with the central node 712 having some mechanism for identifying the node from which the sets of hash values were received.

In step S806, the set of hash values received from node 102 is compared with the set of hash values received from node 702 at the central node 712 to find matching hash values between the sets. In step S808 the number of matching hash values between the sets is counted. The number of matching hash values gives an indication as to whether the users 112 and 710 have similar interests. Since in the hashing scheme each hash value identifies many different interests, some matching hash values may not relate to matching interests. Indeed, if the interests of the users 112 and 710 were selected completely at random from all of the interests that may be identified in the system, there would be an expected number of matching hash values between the two sets that would depend upon the size of the two sets of hash values and upon the number of unique hash values in the hashing scheme used to generate the hash values.

In step S810 is it determined whether the number of matching hash values is greater than the expected number of matching hash values between the two sets of interests if the interests were randomly selected. If there are more matching hash values than expected then that indicates that the users 102 and 710 have similar interests. The level of similarity between the interests of the two users can be quantified by the amount by which the number of matching hash values exceeds the expected number of matching hash values. Indeed, it is possible to attribute a strength value to the similarity of the interests between the users. This information can be used for many purposes. For example, if the central node 712 is used to host a social networking group, the strength of the similarity between two users who are part of the social networking group could be used for one of the users to identify the other user as someone who has similar interests to his own.

Because the hashing scheme uses hash values that do not identify unique interests, the method allows information that relates to interests of people to be used to locate people with common interests without revealing exactly what the interests are. The hash values stored on the central node 712 cannot be used to uniquely identify the interests of a user. The websites that a person visit can be very indicative of interests that a person has. This means that URLs used by a user can be used as the identifiers of the interests of the user. Similarly, search keywords can be used as the identifiers of the interests. The number of hash values in common between two lists can be considered indicative of common interests.

The method can also be applied to files, for example by generating hash values of image file contents of an image sharing site and comparing lists of hash values between two users it can be determined whether they like viewing similar images. As an example, if an average user has viewed 2000 images from a database of 2 million images then using a 16-bit hash value (with 65536 unique hash values) would sufficiently well identify images in two lists of images viewed by users while each hash value would match any of 30 different images. Each matching hash value increases the likelihood that other matching hash values do indeed refer to matching images out of the 30 possibilities in the system. Once a sufficient number of matching hash values are found then there is a high probability that the two users have looked at same images. In other words, if there is a large number of matching hash values, then the two users are identified as having similar interests, and once they are identified as having similar interests then there is an association between the sets of interests of one user and the set of interests of the other user. This can then be thought of in a similar way as in the first particularly useful embodiment described above in which the contact lists of users who know each other are associated. In the same way, where two users have similar interests, then the interests are associated such that it is more likely that another matching hash value is due to a matching interest rather than being due to a random hash collision of different interests.

Therefore, once the users 102 and 710 have been identified as having similar interests, further matching hash values can be assumed to identify matching interests.

In the example shown in FIG. 7, users 102 and 710 both have interests 2 and 3 and the matching hash values will be determined in the central node 712 in step S806. Having two matching hash values will be more than expected for the case where each user has only 3 interests as shown in FIG. 7 and so it will be determined that users 102 and 710 have similar interests.

The method of the third particularly useful embodiment is described above with reference to FIGS. 7 and 8 in relation to information items being identifiers of interests of users. However, the method can be used for other information items where it is desired to identify nodes which have similar information items.

The embodiments described above, use a hashing scheme with fewer unique hash values than there are unique information items in the system such that one hash value cannot be used to identify a unique information item. This ensures privacy and security in the system since a node can transmit the hash values generated from information items stored on the node to another node and the other node cannot determine the information items using the hash values. Hence, the privacy and security are improved whilst the method maintains the ability to identify the presence of matching information items on different nodes in the system.

While this invention has been particularly shown and described with reference to preferred embodiments, it will be understood to those skilled in the art that various changes in form and detail may be made without departing from the scope of the invention as defined by the appendant claims.

What is claimed is:

1. A method of identifying the presence of matching information items in a network, the method comprising:
   using a hashing scheme to generate a set of first hash values from a respective set of first information items stored at a first node;
   transmitting the set of first hash values from the first node over the network to a second node effective to cause the second node to:
   compare the set of first hash values at the second node with a set of second hash values generated, using the hashing scheme, from a respective set of second information items stored in the network, to thereby determine at least one matching hash value between the set of first hash values and the set of second hash values; and
   use the determined at least one matching hash value to identify the presence of at least one matching information item between the set of first information items and the set of second information items; and
   wherein the hashing scheme is chosen so that each hash value is unique with respect to the other hash values and any particular hash value in the hashing scheme indicates at least ten information items to prevent the particular hash value being used as an identifier of a unique information item, such that the transmission of the set of first hash values to the second node does not disclose the set of first information items to the second node.

2. The method of claim 1 wherein the set of second hash values comprises a plurality of second hash values and the set of second information items comprises a respective plurality of second information items.

3. The method of claim 1 wherein the set of first hash values comprises a plurality of first hash values and the set of first information items comprises a respective plurality of first information items.

4. The method of claim 1 wherein the set of second information items is stored on the second node.

5. The method of claim 1 wherein there is an association between the set of first information items and the set of second information items such that the probability that one of the first information items matches one of the second information items is greater than the probability that two different information items are identified by the same hash value in the hashing scheme, such that matching hash values are assumed to be indicative of matching information items.

6. The method of claim 5 wherein the first information items identify contacts of a first user of the first node, and the second information items identify contacts of a second user in the network.

7. The method of claim 1 wherein the transmitting is further effective to cause the second node to:
   count the number of matching hash values between the set of first hash values and the set of second hash values; and
   determine whether the counted number of matching hash values is greater than the expected number of matching hash values based on the number of first hash values, the number of second hash values and the hashing scheme; and
   if the counted number is greater than the expected number, identify that the set of first information items is similar to the set of second information items.

8. The method of claim 7, wherein the transmitting is further effective to cause the second node to use the difference between the counted number and the expected number to attribute a strength value to the similarity between the set of first information items and the set of second information items.

9. The method of claim 7 wherein the first information items identify interests of a first user of the first node, and the second information items identify interests of a second user in the network, and wherein the identification that the set of first information items is similar to the set of second information items identifies that the first and second users have similar interests.

10. The method of claim 9 wherein the first and second information items are one of Uniform Resource Locators, search keywords or images.

11. The method of claim 1, wherein the set of second information items is stored on a third node in the network, and wherein transmitting the set of first hash values from the first node over the network to the second node effective to cause the second node to use the determined at least one matching hash value to identify the presence of at least one matching information item comprises:
   receiving the location of the third node over the network at the first node;
   determining the one of the first information items that corresponds to one of the at least one matching hash value;
   transmitting an identifier of the one of the first information items from the first node to the third node effective to cause the third node to:
     selectively determine the one of the second information items that corresponds to the one of the at least one matching hash value; and
     selectively determine whether the identifier of the one of the first information items also identifies the one of the second information items.

12. The method of claim 11, further comprising transmitting, from the first node, an authentication request to the third node and wherein the transmitting the identifier of the one of the first information items from the first node to the third node is effective to cause the third node to selectively determine the one of the second information items and selectively determine whether the identifier identifies the one of the second information items if the authentication request is accepted by the third node.

13. The method of claim 11 wherein the one of the first information items is more precisely identified by the identifier than by the one of the at least one matching hash value.

14. The method of claim 13 wherein the identifier uniquely identifies the one of the first information items.

15. The method of claim 11 wherein the first and second information items identify files and the method further comprises, if it is determined that the identifier identifies the one of the second information items, receiving the file identified by the one of the second information items from the third node at the first node.

16. The method of claim 1 wherein the total number of unique hash values in the hashing scheme is at least an order of magnitude less than the total number of information items stored in the network.

17. The method of claim 1 wherein the total number of unique hash values in the hashing scheme is at least an order of magnitude greater than the total number of information items in the list of first information items and in the list of second information items.

18. A network comprising:
   a first node comprising:
     means for receiving a set of first hash values over a network from a second node, the hash values generated by the second node from a respective set of first information items stored at the second node using a hashing scheme;
     means for comparing the set of first hash values with a set of second hash values generated, using the hashing scheme, from a respective set of second information items stored in the network, to thereby determine at least one matching hash value between the set of first hash values and the set of second hash values,
   wherein the determined at least one matching hash value is used to identify the presence of at least one matching information item between the set of first information items and the set of second information items, and
   wherein the hashing scheme is chosen so that each hash value is unique with respect to the other hash values and any particular hash value in the hashing scheme indicates at least ten information items to prevent the particular hash value being used as an identifier of a unique information item, such that the transmission of the set of first hash values to the first node does not disclose the set of first information items to the first node.

19. A method of identifying the presence of matching information items in a network, the network comprising at least a first node and a second node, the method comprising:
   receiving, at the second node, a set of first hash values over the network from the first node, the hash values generated by the first node from a respective set of first information items stored at the first node using a hashing scheme;
   comparing the set of first hash values with a set of second hash values generated, using the hashing scheme, from a respective set of second information items stored in the network, to thereby determine at least one matching hash value between the set of first hash values and the set of second hash values;

wherein the determined at least one matching hash value is used to identify the presence of at least one matching information item between the set of first information items and the set of second information items; and wherein the hashing scheme is chosen so that each hash value is unique with respect to the other hash values and any particular hash value in the hashing scheme indicates at least ten information items to prevent the particular hash value being used as an identifier of a unique information item, such that the transmission of the set of first hash values to the second node does not disclose the set of first information items to the second node.

20. The method of claim 19 wherein the first information items identify contacts of a first user of the first node, and the second information items identify contacts of a second user in the network.

* * * * *